3,641,203
POLYESTER MIXTURES SUITABLE AS FOUNDATION MATERIALS
Erich Eimers, Krefeld, and Wolfgang Deninger and Bernhard Alt, Krefeld-Bockum, Germany, assignors to Farbenfabriken Bayer Aktiengesellschaft, Leverkusen, Germany
No Drawing. Filed June 3, 1969, Ser. No. 830,107
Claims priority, application Germany, June 29, 1968, P 17 69 701.7
Int. Cl. C08f 21/02
U.S. Cl. 260—870
5 Claims

ABSTRACT OF THE DISCLOSURE

The invention relates to polyester mixtures suitable as foundation materials which contain the following components:
(a) a polyester which contains the radicals of an $\alpha,\beta$-ethylene-dicarboxylic acid, of a completely or partly hydrogenated o-phthalic acid and of 1,2-propylene glycol;
(b) a N,N - bis - (hydroxyalkyl) - arylamine incorporated with a saturated or unsaturated polyester; and
(c) a copolymerisable vinyl compound.

---

It is known that unsaturated polyester cast resins can also be used as foundation materials. For this purpose, they should cure rapidly at low temperatures. The cured material should be readily grindable and have a dry hard surface. These properties can be attained by an appropriate selection of the components for the synthesis of the polyester.

Polyesters which contain only an $\alpha,\beta$-ethylene-dicarboxylic acid as the dicarboxylic acid component have a high reactivity in curing, but the cured products are not very elastic, they do not adhere well to the substrate and tend to form cracks. It is therefore common procedure to modify the polyester with a non-copolymerisable dicarboxylic acid. For this purpose, o-phthalic acid or its anhydride have proved particularly satisfactory. The phthalic acid anhydride is easy to handle as raw material and during processing, since it can be used in the liquid form. The polyesters prepared therewith give moulding masses of excellent mechanical properties, particularly high hardness and good grindability.

The properties of the polyester resin are further determined by the type of the glycol components. Long-chain aliphatic glycols lead to products which are elastic, but relatively soft. Products with a high surface hardness are obtained by the incorporation of short-chain glycols, such as ethylene glycol or 1,2-propylene glycol. Compared with ethylene glycol, the 1,2-propylene glycol has the advantage that the polyesters produced therefrom are more compatible with polymerisable vinyl monomers. If desired, such low-molecular glycols can be mixed with long-chain glycols. Dipropylene glycol is primarily suitable for this purpose. Compared with products which exclusively contain propylene glycol, the cured moulding masses of polyesters containing dipropylene glycol have an improved elasticity and good grindability and hardness.

The cast resins produced from the above polyesters by mixing with polymerisable vinyl monomers can be cured by peroxide initiators. If an accelerator is added, besides the peroxide initiator, curing can be achieved in the cold without external heat supply. Aryl-N,N-dialkylamines have proved to be particularly satisfactory hardening accelerators. However, low molecular compounds of this type, for example, dimethyl-aniline, have an unpleasant odour which is inconvenient during processing and adheres also to the cured mouldings. Furthermore, some low-molecular amines lead to a reduced storage stability of the cast resin to which they have been added. In addition, a discolouration of the cast resin solutions is frequently observed during storage. The addition of the accelerator shortly before curing, which would have to be carried out by the final consumer, is not expedient, particularly in the case of highly filled cast resins of pasty consistency, as are present, for example, in foundation materials, because there is a risk of incomplete or uneven curing, due to uneven admixing of the accelerator.

These disadvantages are obviated by co-condensing N,N-bis-(hydroxyalkyl)-arylamines with the unsaturated polyesters on which the cast resins are based (cf. U.S. Pat. No. 2,812,313). Mixtures of unsaturated polyesters, saturated polyesters with which the said amines have been incorporated by condensation, and polymerisable monomers can also be used. Such cold hardening polyester cast resins have been widely used in engineering for a long time. The products produced therefrom, which can be cured in a simple way by the final consumer by the addition of a peroxide initiator, exhibit a high reactivity but a comparatively slight discolouration during curing and a good stability in storage. Since the amine is incorporated with a polyester, there is no risk that the usually toxic amines might diffuse out, so that cold-hardening cast resins of this type can also be used without hesitation for the production of storage tanks for the food industry and the like.

However, these cold-hardening polyester cast resins and foundation materials have a serious disadvantage. Their hardening speed decreases during storage. This has a particularly disadvantageous effect, when a rapid curing at low temperatures is required, for example, in the production and repair of road surfacing and in the production of spot foundations.

Surprisingly, it has now been found that this disadvantage can be overcome by working according to the process of the U.S. Pat. No. 2,812,313 but replacing, in the production of the unsaturated polyesters, the phthalic acid with a partly or completely hydrogenated phthalic acid. It is particularly advantageous to use tetrahydrophthalic acid in the form of its anhydride, since this can also be used in the liquid form, as can phthalic acid anhydride. The foundation materials containing such polyesters are characterised by rapid curing, even after prolonged storage, and by their good grindability already shortly after curing.

The object of the invention, therefore, comprises mixtures which are particularly suitable as storable foundation materials and contain the following components:

(a) a polyester which contains the radicals of an $\alpha,\beta$-ethylene-dicarboxylic acid, of a completely or partly hydrogenated o-phthalic acid, preferably tetrahydrophthalic acid, and of 1,2-propylene glycol and optionally of dipropylene glycol, possibly besides smaller amounts of other aliphatic or alicyclic glycols;
(b) a N,N-bis-(hydroxyalkyl)-arylamine incorporated with a saturated or unsaturated polyester; and
(c) a copolymerisable vinyl compound.

For the production of the various polyesters there may be used:

as ethylene-carboxylic acids: e.g. maleic acid, fumaric acid, itaconic acid, citraconic acid, mesaconic acid, optionally also the corresponding anhydrides;
as hydrogenated or partly hydrogenated phthalic acid: e.g. tetrahydrophthalic acid, tetrahydro-endomethylenephthalic acid, hexachloro-endomethylene-tetrahydrophthalic acid and hexahydrophthalic acid (cis- and trans-form) and the anhydrides thereof, as glycols: e.g. 1,2-propylene glycol, dipropylene glycol and other glycols in small amounts, such as diethylene glycol, ethylene glycol and 1,3-butane-diol;

as amines with esterifiable groups: e.g. N,N-bis-($\beta$-hydroxyethyl) - aniline, N - methyl-N-$\beta$-hydroxy-propyl-aniline, N,N-bis-($\beta$-hydroxyethyl)-toluidine and N,N-bis-($\gamma$-hydroxypropyl)-aniline.

These amines can be co-condensed with the unsaturated polyesters or esterified with saturated dicarboxylic acids. In the last-mentioned case the saturated amine-containing polyesters are mixed with the unsaturated polyester in amounts of up to 10% by weight. The content of active nitrogen in the form of the amino group responsible for the acceleration of curing in the finished polyester cast resin should amount to from about 0.01 to about 1% by weight. Since the amine-containing saturated polyesters are added only in limited amounts, it is possible to use also o-phthalic acid or its anhydride as saturated dicarboxylic acid for the synthesis of these esters, without impairing the reactivity constancy.

The amine-containing polyesters are dissolved in polymerisable vinyl polymers with the addition of the known inhibitors. Suitable inhibitors for improving the stability are, for example, hydroquinone, 2,5-dichloro-hydroquinone, 2,5-di-tert.-butyl-hydroquinone, toluhydroquinone, benzoquinone, di-tert.-butyl-benzoquinone, chloranil, 2,5-diphenyl-benzoquinone and copper naphthenate.

Suitable polymerisable vinyl compounds are: e.g. styrene, $\alpha$-methyl-styrene, p-chlorostyrene, vinyl-toluene, acrylic and methacrylic acid ester, acrylic and methacrylic nitrile and diallyl phthalate.

By admixing suitable fillers in amounts of 100–300 percent by weight, referred to the weight of the cast resin solution, for example, highly reactive silicic acids, bentones, kaolin, asbestos, barite and ground slate, it is possible to produce from the cast resin highly reactive foundations of good grindability and stability.

The parts and percents given in the examples are parts and percents by weight.

EXAMPLE 1

(A) A polyester with the acid number 34.2 is prepared in known manner from 1987 parts 1,2-propylene glycol, 1135 parts maleic acid ahydride and 1919 parts phthalic acid anhydride with the addition of 0.33 part hydroquinone, by introducing nitrogen and heating at 190° C. This polyester is dissolved in styrene to give a solution with a solids content of 68.5%. To improve the storage stability, there is added to this solution a further amount of hydroquinone so that the total concentration amounts to 0.016 percent by weight, as well as 0.01 percent by weight di-tert.-butyl-quinone and 22.5 p.p.m. copper naphthenate. The viscosity of the styrene solution amounts to 2900 cp. The solution is subsequently mixed with 1.9 parts of a 70% solution of the amine-containing polyester the production of which is described below under (D), in styrene.

(B) In the same manner as described under (A), a polyester is prepared from a mixture of 1987 parts 1,2-propylene glycol, 1135 parts maleic acid anhydride, 1970 parts tetrahydro-phthalic acid anhydride and 0.33 part hydroquinone, and this is dissolved in styrene in the same manner as described above, with the addition of the inhibitors mentioned above at the same concentration to give a solution with a solids content of 70% and a viscosity of 2900 cp. 1.9 parts of the 70% styrene solution of the amine accelerator (D) are added to this solution which is then mixed with the solution of the unsaturated polyester.

(C) In the same manner as described under (A), a polyester is prepared from 1781 parts 1,2-propylene glycol, 1019 parts maleic acid anhydride and 2000 parts cyclohexane-1,2-trans-dicarboxylic acid (hexahydrophthalic acid); a 71% solution of this polyester in styrene with the addition of the inhibitors mentioned above at the same concentration, has a viscosity of 2920 cp. The solution is mixed with 1.9 percent by weight of the accelerator (D) (70% in styrene).

(D) Preparation of the amine accelerator:

A mixture of 2483 parts N - bis-($\beta$-hydroxyethyl)-p-toluidine and 1460 parts phthalic acid anhydride is melted with the introduction of nitrogen and heated at 170° C. until an acid number of 6 has been reached. The resultant polyester resin is mixed with 5.34 parts hydroquinone and dissolved in styrene to give a solution with a solids content of 70%.

The amine-containing cast resin solutions are cured at 20° C. by the addition of 3 percent by weight of a commercial benzoyl peroxide paste. The effect of the time for which the amine-containing cast resin solution is stored, on the curing time is set out in the following table:

TABLE 1

| Resin solution | Gelling time of the solution | | | | |
| --- | --- | --- | --- | --- | --- |
| | Immediately | After 3 days | After 7 days | After 14 days | After 6 weeks |
| A | 8'15" | 11'35" | 14'25" | 15'25" | 17'15" |
| B | 8'40" | 9'15" | 9'25" | 9'30" | 9'35" |
| C | 9'25" | | 10'5" | 10'40" | 9'40" |

[1] After completion of the amine-containing cast resin solution.

EXAMPLE 2

(A) A polyester with the acid number 49 is prepared in known manner from a mixture of 2000 parts 1,2-propylene glycol, 1550 parts maleic acid anhydride and 1470 parts tetrahydro-phthalic acid anhydride by introducing nitrogen and heating at 190° C. The polyester is dissolved in styrene with the addition of hydroquinone, 2,5-di-butyl-quinone and copper naphthenate to give a solution with a viscosity of 1320 cp., so that the solution contains 0.016 percent by weight hydroquinone, 0.0112 percent by weight dibutyl-quinone and 10 p.p.m. copper naphthenate. The solution is mixed with 2.5 percent by weight of the 70% solution of the amine-containing polyester (D) described above.

(B) In the same manner, a polyester is prepared from 2020 parts, 1,2-propylene glycol, 1550 parts maleic acid anhydride and 1432 parts phthalic acid anhydride and this is converted according to 2(A) into a cast resin with the same content of inhibitor. The solids content of the solution amounts to 64.5 percent by weight; the viscosity to 1370 cp. The solution is mixed with 2.5 percent by weight of the amine accelerator solution (D) described above.

The amine-containing cast resin solutions (A) and (B) are cured at 20° C. with 3 percent by weight of a benzoyl peroxide paste.

TABLE 2

| Resin | Gelling time of the solution | | |
| --- | --- | --- | --- |
| | Immediately | After 4 weeks | After 8 weeks [1] |
| A | 6 | | 7 |
| B | 6 | 9 | 11 |

[1] After completion of the amine-containing cast resin solution.

We claim:

1. Polyester mixtures suitable as foundation materials which contain (a) a polyester based on an $\alpha,\beta$-ethylene-dicarboxylic acid, a completely or partially hydrogenated o-phthalic acid and 1,2 - propylene glycol; (b) an o-phthalic acid polyester having chemically incorporated therein a N,N-bis-(hydroxyalkyl)-arylamine and (c) a styrene or vinyl toluene monomer.

2. Mixtures according to claim 1 the nitrogen content of which amounts to from about 0.01 to about 1% by weight.

3. Mixtures according to claim 1, wherein the hydrogenated phthalic acid in the polyester (a) is tetrahydrophthalic acid.

4. Mixtures according to claim 1, wherein the polyester (a) contains, in addition, the radicals of dipropylene glycol.

5. Mixtures according to claim 1, wherein the N,N-bis-(hydroxyalkyl)-arylamine of (b) is N,N-bis-($\beta$-hydroxyethyl)-toluidine.

References Cited

UNITED STATES PATENTS

| | | | |
|---|---|---|---|
| 2,812,313 | 11/1957 | Nischk et al. | 260—870 |
| 2,857,358 | 10/1958 | Thomas | 260—870 |

OTHER REFERENCES

Boenig, Unsaturated Polyesters, Elsevier, New York 1964 (p. 189).

MELVIN GOLDSTEIN, Primary Examiner

U.S. Cl. X.R.

260—75 N, 863, 864